United States Patent [19]

Bates et al.

[11] 4,017,302
[45] Apr. 12, 1977

[54] TANTALUM METAL POWDER

[75] Inventors: Victor T. Bates, Kenosha, Wis.;
Stanley S. Fry, North Chicago;
James B. Hakko, Waukegan, both of Ill.

[73] Assignee: Fansteel Inc., North Chicago, Ill.

[22] Filed: Feb. 4, 1976

[21] Appl. No.: 655,159

[52] U.S. Cl. .................. 75/.5 BB; 75/228
[51] Int. Cl.² ............................. B22F 1/04
[58] Field of Search ......... 75/.5 BB, 84; 148/126; 29/192 R

[56] References Cited

UNITED STATES PATENTS

| | | | |
|---|---|---|---|
| 2,107,279 | 2/1938 | Balke et al. | 75/.5 BB |
| 3,295,951 | 1/1967 | Fincham et al. | 75/.5 BB |
| 3,415,639 | 12/1968 | Daendliker et al. | 75/.5 BB |
| 3,697,255 | 10/1972 | Baldwin et al. | 75/.5 BB |

*Primary Examiner*—W. Stallard
*Attorney, Agent, or Firm*—Barnes, Kisselle, Raisch & Choate

[57] ABSTRACT

Improved, high-purity agglomerated tantalum powders characterized by exceptionally high green strength when pressed without using a carbonaceous binder into low density anodes and high electrical capacitance along with low direct current leakage and dissipation factor in the anodes after sintering. Such powder is produced by milling hydrided high-purity tantalum metal ingots or powder to a critical particle size powder, subjecting the powder to a two-step heat treatment to degas and pre-agglomerate it, screening and milling the oversize portion of the degassed and pre-agglomerated powder to achieve intermediate mesh size powder, subjecting this powder to a higher temperature treatment to agglomerate it, milling the agglomerated powder to an intermediate mesh fraction, screening the powder to remove the fine particle size portion, subjecting this fine particle material to an additional heat treatment to re-agglomerate it, and blending the re-agglomerated fines with the coarser mesh size portions of the agglomerated powder.

18 Claims, 8 Drawing Figures

GREEN STRENGTH OF 2-GRAM, 0.261 IN. DIAMETER POWDER COMPACTS PRESSED TO DENSITY OF 7.0 g/cm³.

GREEN STRENGTH DATA ON 2-GRAM, 0.261 IN. DIA. POWDER COMPACTS PRESSED FROM POWDERS NOT TUMBLED AND TUMBLED AT PRESSED DENSITIES OF 7.0, 7.5 & 8.0 g/cm³

FIG. 5

GREEN STRENGTH OF 2-GRAM, 0.261 IN. DIAMETER POWDER COMPACTS OF POWDERS OF COMPLETE LOTS PRESSED TO DENSITIES OF 7.0, 7.5 & 8.0 g/cm³

LEGEND:
- EXAMPLE 4A — POWDER OF THIS INVENTION, PREPARED PER EXAMPLE-1.
- EXAMPLE 4B — POWDER PREPARED PER EXAMPLE 2.
- EXAMPLE 4C — POWDER PREPARED PER EXAMPLE 3.
- EXAMPLE 4D — ANOTHER STATE OF THE ART AGGLOMERATED POWDER.

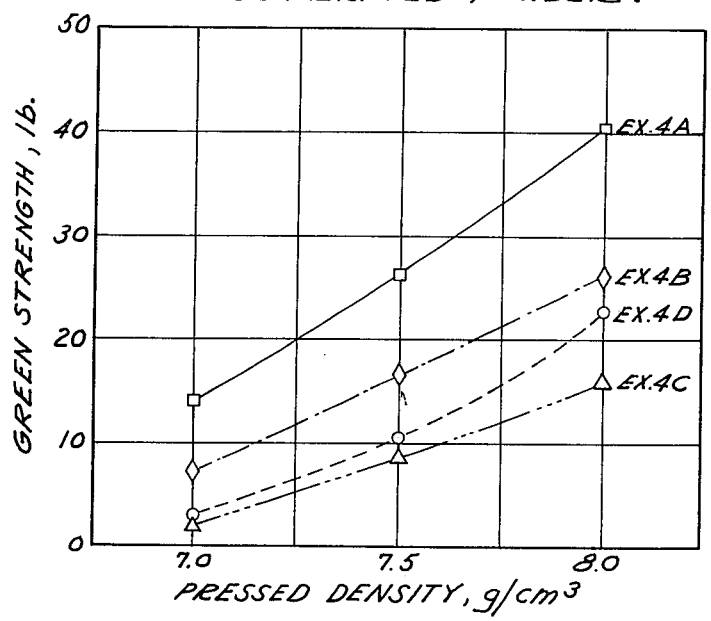

FIG. 6

GREEN STRENGTH OF 2-GRAM, 0.261 IN. DIAMETER POWDER COMPACTS OF +325 MESH FRACTION OF POWDERS PRESSED TO DENSITIES OF 7.0, 7.5 & 8.0 g/cm³

LEGEND: SAME AS IN FIG. 5

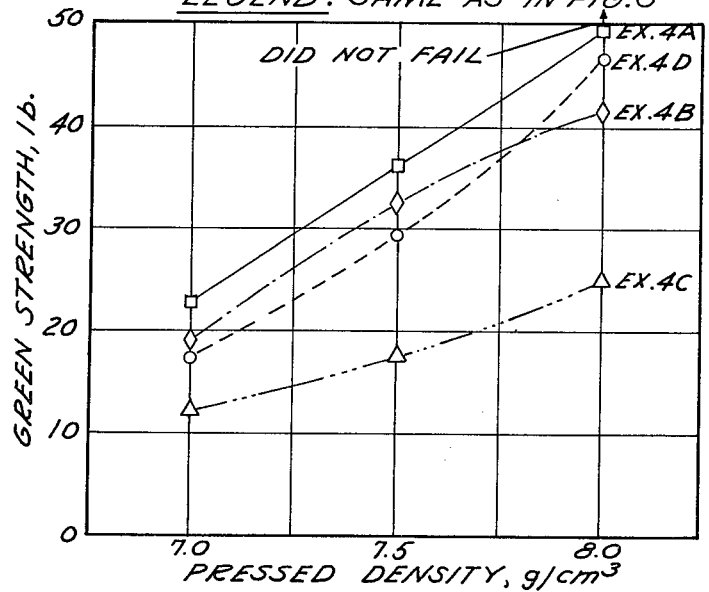

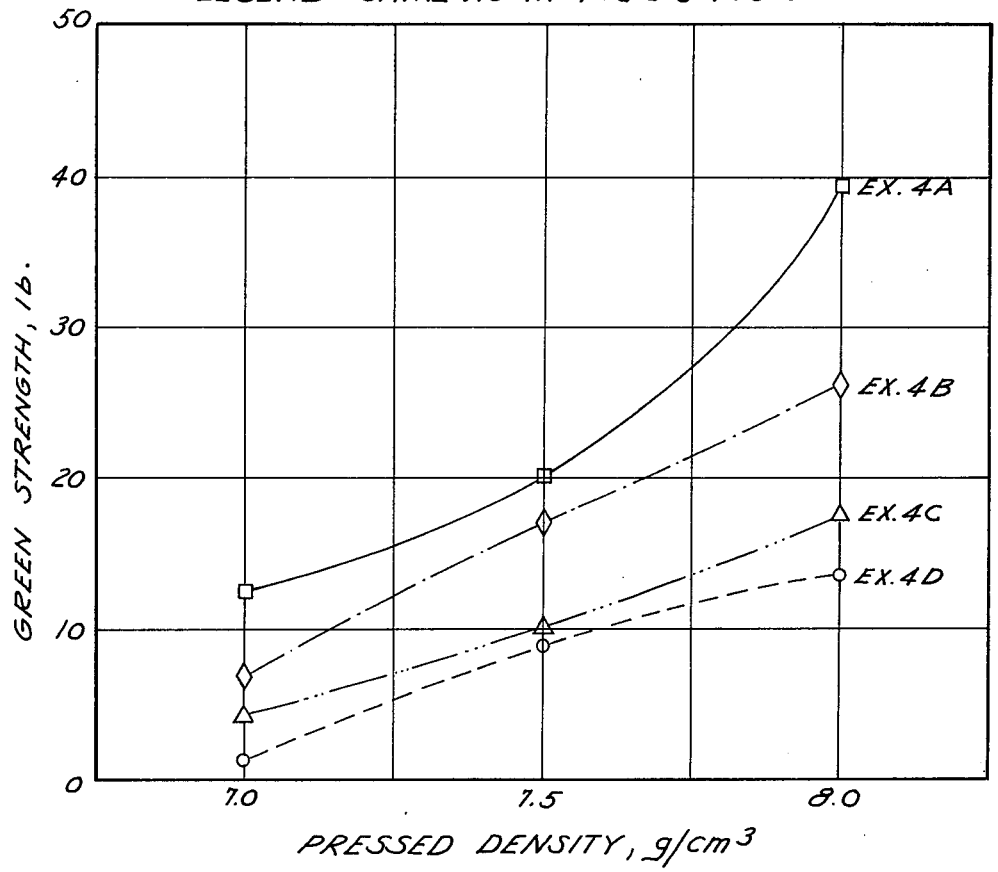

TANTALUM METAL POWDER

BACKGROUND OF THE INVENTION

This invention relates to improved tantalum powders and to anodes prepared therefrom and specifically to powders that can be pressed without using a binder into anodes with high green strength before sintering and with excellent electrical characteristics after sintering. These powders also have good flow characteristics which are achieved without additives.

One common and well-known use of tantalum powder is for producing electrodes for either solid or liquid type electrolytic capacitors. Such electrodes are made by pressing the tantalum powder to form a coherent compact, sintering this compact, and subsequently forming a dielectric film on the sintered compact.

In such capacitors it is desired to have as high specific capacitance CV/g as possible. U.S. Pat. No. 3,418,106 to Pierret, dated Dec. 24, 1968, discloses an agglomerated tantalum powder, crushable as tantalum, which, when fabricated into an electrode, provides enhanced specific capacitance. The agglomerated tantalum powder described in this patent also has improved flow characteristics as compared to prior powders. The method used to produce such agglomerated tantalum powder is disclosed in U.S. Pat. No. 3,473,915 to Pierret, dated Oct. 21, 1969. The two referenced Pierret patents describe generaly the nature of agglomerated tantalum powders.

Although such powders have reasonably good flow characteristics, to make these powders and other prior art powders dispensable in automatic pellet-making machines at high speed with good weight control from pellet to pellet, the capacitor manufacturers historically have added binders to the powders. The binders generally are a carbonaceous type, such as carbowax, arcrawax and glyptol. Such binders also were necessary to provide adequate "green" strength (a condition after forming but prior to sintering) in the pressed compact to withstand handling during pressing or loading for subsequent sintering. However, the use of carbonaceous binders is objectionable because a two-step sintering cycle (a dewaxing heat treatment followed by a higher temperature heat treatment is necessary. In addition, residual carbon remaining in the sintered parts tended to reduce the electrical qualitities.

In the manufacture of compacts using high speed automatic presses, a percentage of the powder is not pelletized due to intentional die overfill. In addition, some parts are defective as pressed, and are crushed to powder. The overfill powder and the powder recovered from such crushed compacts is recycled and ultimately can be pressed a second time, or a third time, or more. State-of-the-art powders tend to be degarded in quality or characteristics during such recycle.

SUMMARY OF THE INVENTION

In accordance with the present invention, there is provided an improved agglomerated tantalum metal powder which has good flow properties and can be used to produce low density compacts with a high green strength without adding a binder. When such compacts are utilized as anodes in electrolytic capacitors, they exhibit minimum shrinkage during sintering, high capacitance and low direct current leakage and dissipation factor.

Furthermore, such powder has excellent cyclability in pressing operations compared to state-of-the-art powders.

These combined desirable characteristics of powder of this invention result in porous, high quality anodes that generally can be used at higher working voltages and provide greater reliability and longer life.

Other objects and features of the invention relating to details of composition and steps in the method of production and claims in which the principles and utility of the invention are set forth together with the best modes presently contemplated for the practice of the invention.

BRIEF DESCRIPTION OF THE DRAWINGS

DRAWINGS accompany the disclosure and the various views thereof may be briefly described as:

FIG. 5, a second green strength comparison chart for complete lots.

FIG. 6, a third green strength chart for +325 mesh fraction of powders.

FIG. 7, a fourth green strength chart for −325 mesh fraction of powders.

DETAILED DESCRIPTION OF THE INVENTION

While the invention is detailed below particularly with respect to tantalum powder, it will be appreciated that the desirable characteristics achieved by the method will also be obtained when other metals are used. In addition to tantalum, the process may be used with hydride forming metals of Group IVB including titanium, zirconium, and hafnium, and Group VB including, in addition to tantalum, vanadium, and columbium (niobium).

Figure 1:
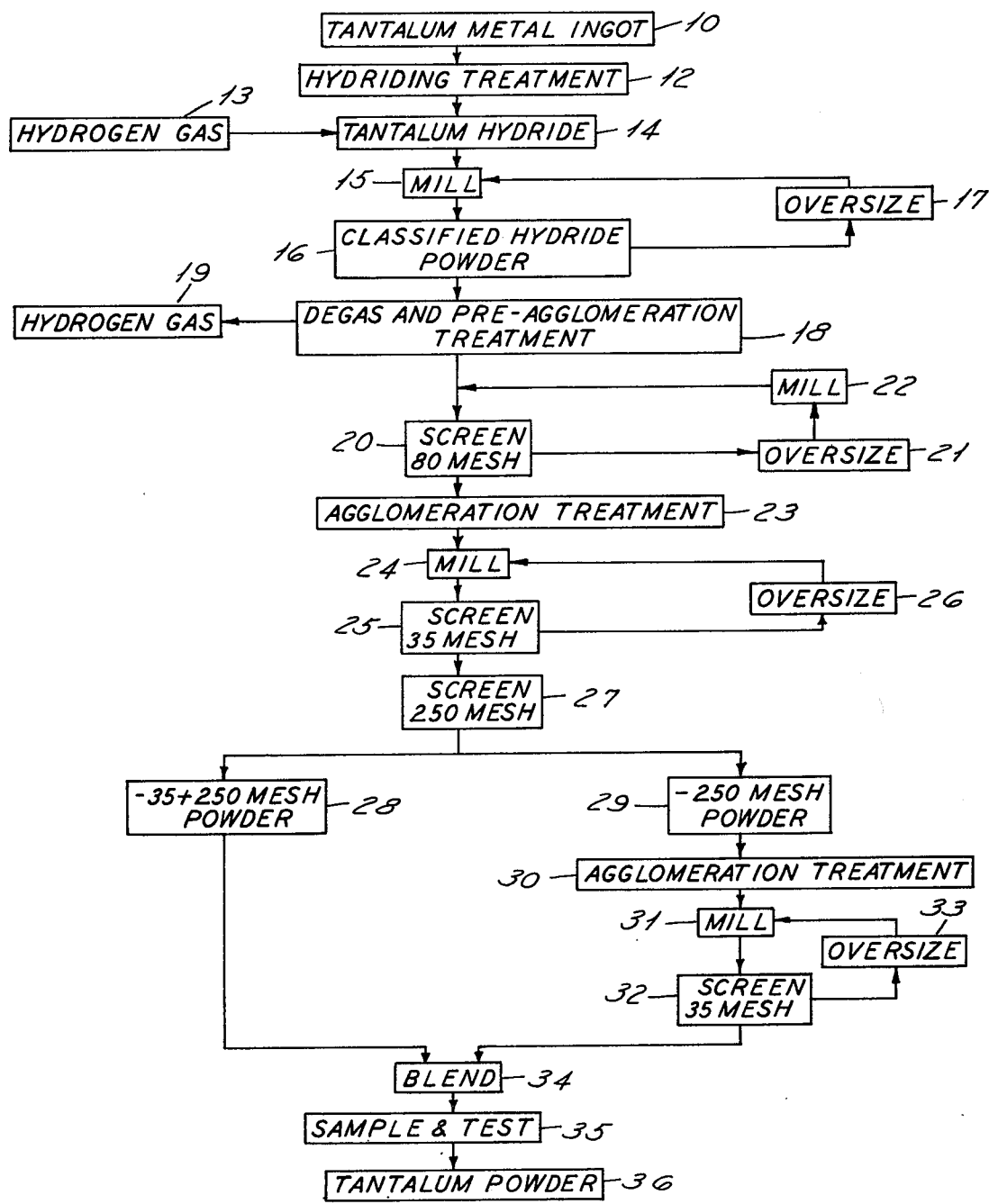
FIG. 1, a flow chart diagramming the process of powder treatment.

FIG. 1 is a schematic flow diagram for the general embodiment of the invention using tantalum ingots as the starting material. Tantalum metal, shown at 10 in this flow diagram, may be obtained from several optional sources or raw material processes, depending on the intended use and properties required of the final powder. When the final powder is intended for use as electrodes in capacitors, the tantalum metal must be high purity, with all impurities at adequately low levels to achieve the desired electrical properties. Tantalum metal consolidated into ingots by electron-beam melting or by consumable-electrode, arc melting are preferred sources for such high purity tantalum metal. Another preferred source is high purity tantalum metal powder produced by sodium reduction of potassium tantalum fluoride, $K_2TaF_7$, typically at temperatures above the melting point of all ingredients and products except tantalum, which precipitates as a fine powder.

The tantalum metal ingot 10 is subjected to a hydriding treatment 12 by heating it in a hydrogen atmosphere 13 by procedures well known in the art. This treatment results in absorption of about 0.4 wt % (percent by weight) hydrogen in the tantalum, converting it to an embrittled form called tantalum hydride shown at 14.

The tantalum hydride 14 is milled at 15 by crushing to the desired particle size, in a preferred range of 3 to 6 microns, which is commonly measured as Fisher sub-sieve size in accordance with ASTM B330-65, "Standard Method Of Test for Average Particle Size of Refractory Metals and Compounds by the Fisher Sub-Sieve Sizer." The attainment of the desired Fisher size is very critical, especially as it relates to capacitance of electrodes sintered from the final powder. This requires that the milled hydride be classified 16, with the oversize 17 recycled for further milling 15.

The classified hydride powder 16 is heated under non-reactive conditions. i.e., vacuum or high-purity argon or helium, in a degassing and pre-agglomeration treatment 18. It is first heated to about 800° C. to remove the hydrogen 19; then it is further heated to about 1100° to 1300° C. This treatment results in a loosely agglomerated mass in which, it is believed, the finer particles tend to become bonded to other particles, but with little bonding occurring between the coarser particles.

Following this treatment, the material is screened 20 to pass through typically about an 80Mesh (U.S. Standard) screen with any oversize material 21 subjected to milling 22 and re-screening 20. In order to attain maximum benefits in the final powder of this invention, as much material as possible should be directly screened to the desired mesh fraction without remilling.

The powder next is subjected to an agglomeration treatment 23 by heating it under chemically non-reactive conditions, i.e., in vacuum or under high-purity inert gases such as argon or helium, to a temperature of about typcially 1375° to 1425° C. The agglomerated cake is milled 24 to obtained the desired mesh size, typcially about −35 mesh, by screening 25. The oversize 26 is remilled and rescreened. Milling should only be the minimum amount necessary to obtain the desired mesh size since overmilling creates fines which are detrimental to the properties of the final powder. The fines particularly reduce green strength and increase shrinkage during sintering.

The typically −35 mesh agglomerated powder is screened 27 to obtain typically about a −35+250 mesh powder 28 and a typically −250 mesh powder 29. With respect to the negative (−) and positive (+) mesh designations, negative (−) means the particles will pass through the designated mesh. For example, −35 mesh particles will pass through the 35 mesh screen and +35 mesh will be retained by the 35 mesh screen. A +250 mesh powder will not pass through the 250 mesh screen, whereas the −260 powder does pass through a 250 mesh screen.

The typically −250 mesh material 29 is subjected to an additional agglomeration treatment 30 by heating the powder under chemically non-reactive conditions, i.e., vacuum or high-purity argon or helium, to about typically 1450° to 1500° C. This material is milled 31 and screened 32 to pass a 35 mesh screen with any oversize material 23 being remilled 31 and rescreened. Overmilling should be avoided so as not to create an excessive amount of fnes that adversely affect the final powder.

The typically −35+250 mesh powder 28 and typically −35 mesh powder from Step 32 are blended 34, then sampled and tested 35 to attain the final tantalum powder 36.

The specific particle or screen sizes of the powder must be closely controlled, but the specific sizes selected can be varied to achieve the desired combination of characteristics in the final powder. Similarly, the specific temperatures used in the pre-agglomeration and agglomeration steps must be closely controlled, but the specific temperatures selected can be varied as needed to achieve the desired combination of characteristics in the final powder.

Thus, the general embodiment described above and the following examples are for illustrative purposes only and should not be construed to limit the invention which is described in the appended claims.

EXAMPLE 1 a. Tantalum hydride powder was prepared by crushing an electron-beam melted tantalum ingot that had been saturated with hydrogen gas at an elevated temperature. The hydride was milled and classified to a Fisher sub-sieve size of 4.15 microns. Apparent density, hereafter called "Scott density," was determined on this powder by the procedure of ASTM designation B212-48, "Determination of Apparent Density of Metal Powders," and was found to be 75.5 g/in$^3$.

b. The tantalum hydride powder was heated under a high purity flowing argon atmosphere to 800° C. and held for two hours at temperature to evolve the hydrogen. Then the furnace was evacuated to about $10^{-3}$ torr, and the tantalum powder (degassed tantalum hydride) was further heated to 1200° C. and held for ½ hour at temperature. Then this degassed and pre-agglomerated powder was cooled under vacuum for 2 hours and then under helium during cooling to ambient temperature.

c. The degassed and pre-agglomerated powder was screened using an 80 Mesh U.S. Standard screen. The oversize material was milled so that all powder was −80 Mesh. The −80 Mesh material was 89.5% −325 Mesh by a screen test, had a Fisher sub-sieve size of 5.6 microns and a Scott density of 76.8 g/in$^3$.

d. The −80 Mesh powder was heated in vacuum (about $10^{-3}$ torr) to 1410° C. and held for 1 hour at temperature, then cooled under vacuum for 2 hours and finally under helium to ambient temperature to obtain agglomerated tantalum powder.

e. The agglomerated powder was milled and screened using a 35 Mesh screen, with any oversize material remilled and rescreened so that all powder was −35 Mesh.

f. The −35 Mesh agglomerated powder was further screened using a 250 Mesh screen. The −35+250 Mesh portion of the powder was set aside so that it could be blended later with the −250 Mesh portion of the powder, which was further processed.

g. The −250 Mesh powder was subjected to an additional agglomeration treatment by heating it in vacuum (about $10^{-3}$ torr) to 1475° C. and holding for 1 hour at temperature, followed by cooling in vacuum for 2 hours, then in helium to ambient temperature.

h. The agglomerated −250 Mesh material was milled and screened to −35 Mesh.

i. This −35 Mesh powder from step (h) was blended with the −35+250 Mesh powder from step (f).

j. This final tantalum powder was sampled and tested. The Fisher sub-sieve size was 9.6 microns, Scott density was 65.7 g/in$^3$, and a screen test showed:
+80 Mesh — 37.3%
−80 + 200 Mesh — 13.1%
−300 + 325 Mesh — 5.7%
−325 Mesh — 43.9%

A Roller analysis of the −325 Mesh fraction showed a particle size distribution of:

0 − 3 microns — 0.35%
3 − 5 microns — .86%
5 − 10 microns — 8.44%
10 − 15 microns — 17.40%
15 − 20 microns — 40.65%
20 − 25 microns — 21.43%
25 − 30 microns — 10.86%
30 − 35 microns — .01%

The final tantalum powder was found to have a Hall flow of 49 seconds when measured in accordance with "Standard Method of Test for Flow Rate of Metal Powders," ASTM designation B213-48 (reapproved 1965), except that the test unit was modified to vibrate the Hall flow cup, with the cup vibrated at a frequency of 3600 cycles and an amplitude of 0.024 inch.

The powder was pressed into individually weighed 2.010 ± 0.020 gram compacts in a 0.261 inch diameter die to a green density of 7.0 ± 0.05 g/cm$^3$ for determination of "green" strength. The compacts individually were laid sideways under the anvil of a Chatillon Model LTCM Universal Tensile, Compression and Spring Tester provided with a flat anvil and base and crushed at a compression rate setting of 2.0. The pressure in pounds required to crush the compact was recorded as the green strenght. Four compacts were tested for green strength and the data averaged. In this test, if any compacts shows a green strength value that is an outlier, as determined in accordance with ASTM designation E-178-61T, an additional anode is pressed and tested. (An outlying observation, or outlier, is one that appears to deviate markedly from other members of the set in which it occurs.)

Green strength was determined on the final powder and on the +325 and −325 Mesh fractions of screened samples of the powder. Green strength results were in the range of 12 to 30 pounds as follows:

|  | Green Strength lb. |
| --- | --- |
| Final tantalum powder | 18.1 − 18.4 |
| +325 Mesh fraction | 27.2 |
| −325 Mesh fraction | 12.3 |

Chemical analyses on the final powder showed an oxygen content of 1615 ppm (0.1615 wt. %), a nitrogen content of 18 ppm (0.0018 wt. %), a carbon content of 20 ppm (0.0020 wt. %), and an iron content of 15 ppm (0.0015 wt. %).

For electrical tests, the powder was pressed into individually weighed 2-gram anodes with an embedded lead wire in a 0.261 inch diameter die to a green density of 7.2 ± 0.05 g/cm$^3$. The anodes were sintered either for 30 minutes at 1800° C. (optical) or for 30 minutes at 2000° C. (optical) in a cold-wall, vacuum sintering furnace (10$^{-5}$ torr absolute pressure), and then were tested for shrinkage in diameter during sintering and for electrical properties including direct current leakage, specific capacitance (cv/g) and dissipation factor.

The electrical testing procedure involved anodizing the sintered anodes in 0.01% phosphoric acid in water. Anodizing was carried out at a current density of 35 milliamps per gram until 200 volts was reached. The anodes sintered at 1800° C. were held at 200 volts for 2 hours. The anodes sintered at 2000° C. were anodized using a current density of 35 milliamps per gram to 200 volts, and then at 12 milliamps per gram from 200 to 270 volts; they were held at 270 volts for 1 hour.

The anodes, after anodizing, rinsing and drying, were first tested for direct current leakage (DCL). A phosphoric acid solution was employed. The test conditions were as follows:

| Anode Formation Voltage | Test Electrolyte Concentration | Test Voltage |
| --- | --- | --- |
| 200 | 10.0% H$_3$PO$_4$ | 140 |
| 270 | 0.01% H$_3$PO$_4$ | 240 |

The anodes were immersed in the test solution to the top of the anode and the proper voltage was applied for 2 minutes, after which the DCL was measured.

After DCL measurements were completed, the anodes formed to 200 volts were placed in a tray containing 10% phosphoric acid and permitted to soak 30 to 45 minutes.

The anodes formed to 270 volts were washed for 3 to 5 minutes at 105° ± 5° C. in air. They were then soaked in 10% phosphoric acid for 30 to 45 minutes.

The capacitance was measured on the anode immersed in 10% phosphoric acid employing a type 1611B General Radio Capacitance Test Bridge with an a.c. signal of 0.5 volts and a d.c. bias of 3 volts. The dissipation factor also was determined from this bridge set. The results were:

|  | Anodes sintered for 30 Minutes at | |
| --- | --- | --- |
|  | 1800° C. | 2000° C. |
| Shrinkage in dia., % | 4.3 | 8.3 |
| Direct current leakage (DCL), $\mu a/\mu f - v \times 10^5$ | 26.9 | 80.3 |
| Capacitance, $\mu f - v/g$ | 3936 | 3011 |
| Dissipation factor, % | 14.8 | 11.0 |

EXAMPLE 2 a. Tantalum powder from the same ingot and Tantalum hydride lot was processed by the same procedure as used in Example 1, steps (a) through (e). Thus, it represented powder that had received the same degassing, preagglomeration and agglomeration treatments, and intermediate and final milling and sizing; however, it did not have the fine -250 Mesh material removed, reagglomerated, milled, and then blended with the coarser material.

b. The powder thus processed was tested using the same procedures as described in Example 1, step (j). The results were:

| Fisher sub-sieve size, microns | 7.3 |
| --- | --- |
| Scott density, g/in$^3$ | 72.7 |
| Screen test, % |  |
| +80 Mesh | 29.5 |
| −80 + 200 Mesh | 9.5 |
| −200 + 325 Mesh | 3.0 |
| −325 Mesh | 58.0 |
| Roller analysis of −325 Mesh, % |  |
| 0 − 3 microns | 0.55 |
| 3 − 5 microns | 2.55 |
| 5 − 10 microns | 18.68 |

-continued

| | |
|---|---|
| 10 – 15 microns | 26.89 |
| 15 – 20 microns | 45.52 |
| 20 – 25 microns | 4.06 |
| 25 – 30 microns | 1.76 |
| 30 – 35 microns | nil |
| Hall flow, sec. | 50 |
| Green strength, lb. | |
| Final tantalum powder | 6.4 |
| +325 Mesh fraction | 16.7 |
| −325 Mesh fraction | 4.8 |
| Chemical analysis, ppm | (wt.%) |
| Oxygen 1580 | (0.1580) |
| Nitrogen 18 | ( .0018) |
| Carbon 20 | ( .0020) |
| Iron 15 | ( .0015) |

| Sintered anodes | Anodes sintered for 30 Minutes at | |
|---|---|---|
| | 1800° C. | 2000° C. |
| Shrinkage in dia., % | 5.8 | 9.7 |
| Direct current leakage (DCL), $\mu a/\mu f - v \times 10^5$ | 14.8 | 74.8 |
| Capacitance, $\mu f - v/g$ | 4096 | 3023 |
| Dissipation factor, % | 15.2 | 10.4 |

EXAMPLE 3 a. This example shows the processing and resulting properties of tantalum powder produced according to the teachings of U.S. (Pierret) Pat. No. 3,473,915 and is representative of state-of-the-art agglomerated tantalum powder. Tantalum hydride powder was prepared as in Example 1, step (a), and had a typical Fisher sub-sieve size of about 4.1 microns and Scott density of about 75 g/in³.

b. The tantalum hydride powder was heated under a flowing high purity argon atmosphere to 800° C. and held for two hours at temperature to evolve the hydrogen. Then the furnace was evacuated to about 10⁻³ torr and the resulting degassed tantalum powder was cooled for 2 hours under vacuum and subsequently under helium to ambient temperature.

c. The degassed tantalum powder was heated in vacuum (about 10⁻³ torr) to 1410° C. and held for one hour at temperature, then cooled under vacuum and finally under helium to ambient temperature to obtain agglomerated tantalum powder.

d. The agglomerated powder was milled and screened using a 35 Mesh screen with any oversize material remilled and rescreened so that all powder was −35 Mesh.

e. The powder thus processed was tested using the same procedures as described in Example 1, step (j). Typical properties of such powder are:

| | |
|---|---|
| Fisher sub-sieve size, microns | 7.2 |
| Scott density, g/in³ | 73 |
| Screen test, % | |
| +80 Mesh | 24 |
| −80 + 200 Mesh | 12 |
| −200 + 325 Mesh | 5 |
| −325 Mesh | 59 |
| Roller analysis of −325 Mesh, % | |
| 0 – 3 microns | 1.3 |
| 3 – 5 microns | 7.0 |
| 5 – 10 microns | 31 |
| 10 – 15 microns | 29 |
| 15 – 20 microns | 29 |
| 20 – 25 microns | 1.5 |
| 25 – 30 microns | 1.0 |
| 30 – 35 microns | .2 |

-continued

| | |
|---|---|
| Hall flow, sec. | 45 |
| Green strength, lb. | |
| Final tantalum powder | 2.0 |
| +325 Mesh fraction | 12.0 |
| −325 Mesh fraction | 4.1 |
| Chemical analysis, ppm | (wt.%) |
| Oxygen 1650 | (0.1650) |
| Nitrogen 20 | ( .0020) |
| Carbon 15 | ( .0015) |
| Iron 15 | ( .0015) |

| Sintered anodes | Anodes sintered for 30 Minutes at | |
|---|---|---|
| | 1800° C. | 2000° C. |
| Shrinkage in dia., % | 6.5 | 10.5 |
| Direct current leakage (DCL), $\mu a/\mu f - v \times 10^5$ | 25 | 75 |
| Capacitance $\mu f - v/g$ | 3850 | 2900 |
| Dissipation factor, % | 17 | 15 |

DISCUSSION OF EXAMPLES 1, 2, and 3

In considering the test results of the examples, it should be appreciated that the physical and electrical properties of tantalum capacitor powders represent a complex interaction of many variables. These variables include particle size and distribution, degree and type of powder agglomerates formed, stability of the agglomerates, and effects of the various heat treatments, milling and classification practices, pressed density of the compacts, and sintering conditions used. Usually when efforts are made to optimize or improve on some specific characteristic, such improvement is generally accompanied by corresponding trade-offs (losses or reduction) in some other characteristics of the powder.

By contrast, the powder of this invention shows a remarkable improvement in green strength, accompanied by a substantial reduction in shrinkage and higher capacitance than original state-of-the-art agglomerated powders, while maintaining essentially the equivalency in all other physical and electrical characteristics.

Figure 2:
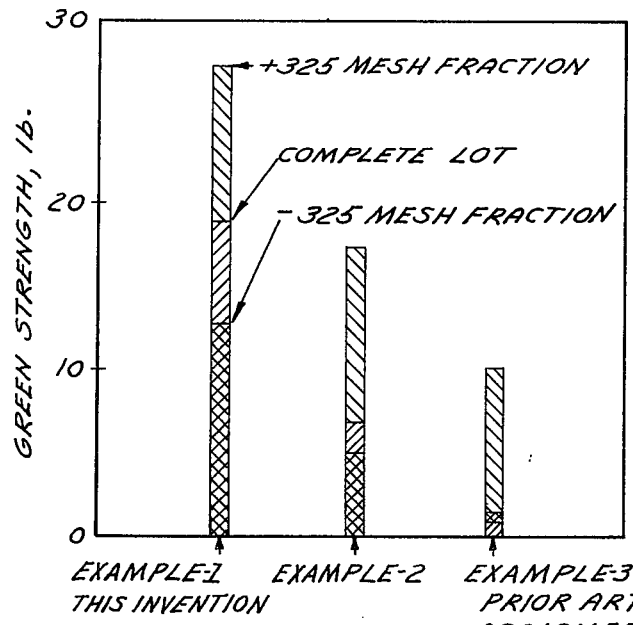
FIG. 2, a green strength comparison chart for the examples presented in the specification.

FIG. 2 shows the marked increase in green strength achieved by powder of this invention, EXAMPLE 1, in comparison to prior art agglomerated powders, EXAMPLES 2 and 3. The increase in green strength occurs not only in the overall lot but also in the +325 and −325 Mesh fractions as well. This indicates that the process used in the invention and the resulting powder product, compared to agglomerated powder of the prior art, represents a different, restructuring of the agglomerated particles. The powder of this invention appears to be a more fully botryoidal type of agglomerated particle structure and results in an improved compacted structure in the anodes. This is demonstrated by the fact that the green strength of the overall powder lot of Example 3 was lower than that of the separately tested +325 and −325 Mesh fractions, whereas in Examples 1 and 2 the green strength of the overall lot was greater than that of the −325 Mesh and less than that of the +325 Mesh fraction.

Figure 3:
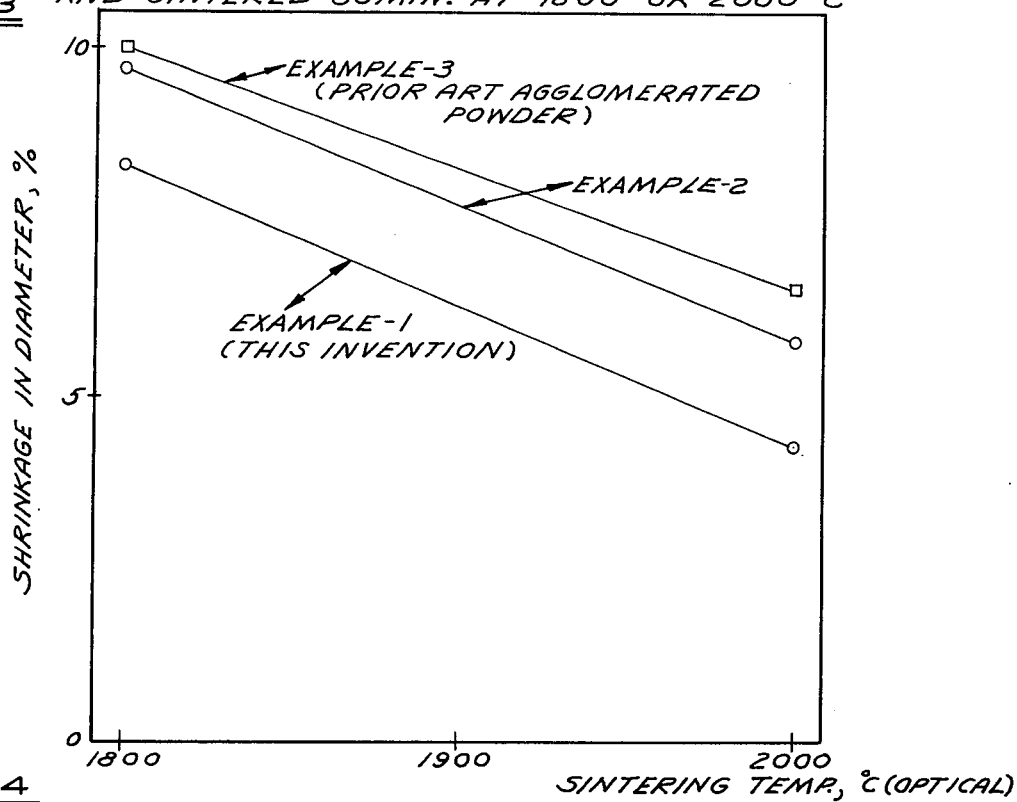
FIG. 3, a shrinkage comparison chart.

FIG. 3 shows that the powder of this invention, Examples 1, exhibits considerably less shrinkage in diameter during sintering than agglomerated powders of the prior art, Examples 2 and 3.

Figure 4:
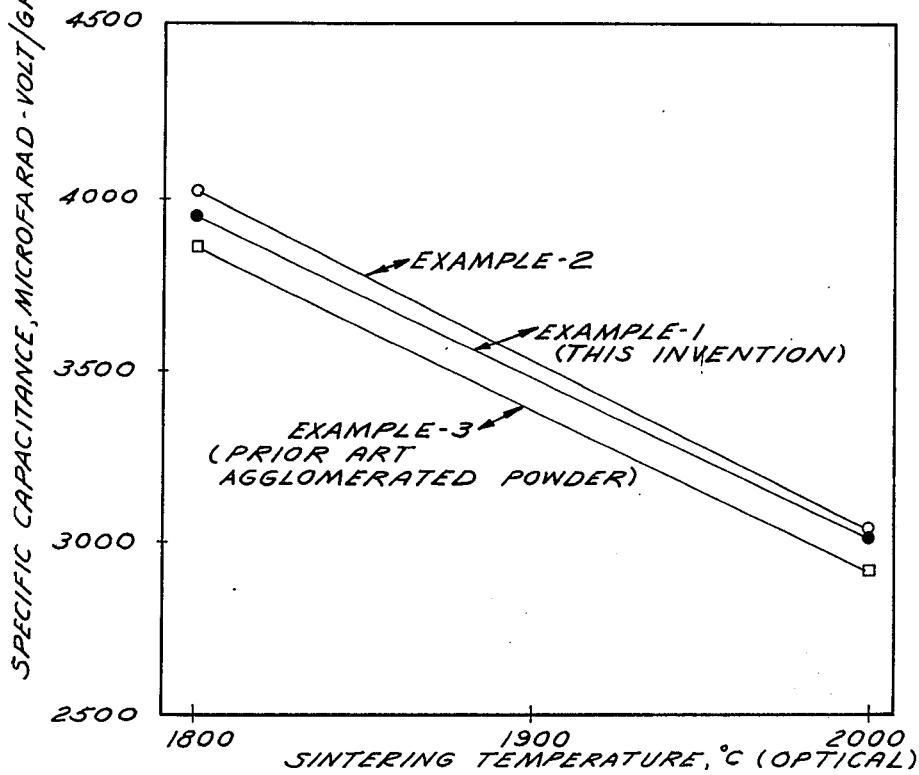
FIG. 4, a specific capacitance comparison chart.

FIG. 4 shows that the specific capacitance of powder of this invention, Example 1, is higher than that of the prior art agglomerated powder of Example 3 and quite close to that of Example 2.

From FIG. 4, the relationships between specific capacitance and sintering temperature were derived from the point-slope determination of the equations of the straight lines, or $$y - y_1 = m(x - x_1)$$

giving the following equations for the examples, where T ia expressed in ° C.
  Example 1: CV/g = 4.625T + 12,261
  Example 2: CV/g = 5.365T + 13,753
  Example 3: CV/g = 4.750T + 12,400

The lower slope of the powder of this invention indicates that it is a more stable powder than prior art agglomerated powder, and shows less decrease in capacitance as the sintering temperature is increased than do the other powders. Because of this improved stability, although the powder of this invention shows a slightly lower capacitance when sintered at 1800° C. for ½ hour than the powder processed accordance with Example 2, the capacitance of anodes sintered at 2000° C. for 30 minutes was about the same for Examples 1 and 2.

The other characteristics of powders of this invention such as chemical composition, Hall flow, and direct current leakage and dissipation factor are essentially equivalent to agglomerated powders of the prior art.

EXAMPLE 4

(a) Powders were prepared as in Examples 1, 2 and 3, but using ingots from different lots. These powders are designated as Examples 4A, 4B, and 4C, respectively. Examples 4D is also included and represents another commercially available, state-of-the-art agglomerated powder manufactured by another powder producer. All of these powders were individually pressed into compacts for determination of green strength as described in Example 1, except that compacts were pressed to green densities of 7.0 ± 0.05, 7.5 ± 0.05, and 8.0 ± 0.05 g/cm³. The data are plotted to show the green strength as a function of pressed density for the complete lot in FIG. 5, the +325 Mesh fraction in FIG. 6, and the −325 Mesh fraction in FIG. 7. The data clearly demonstrates the superior green strength of powder of this invention, Example 4A.

Figure 8:
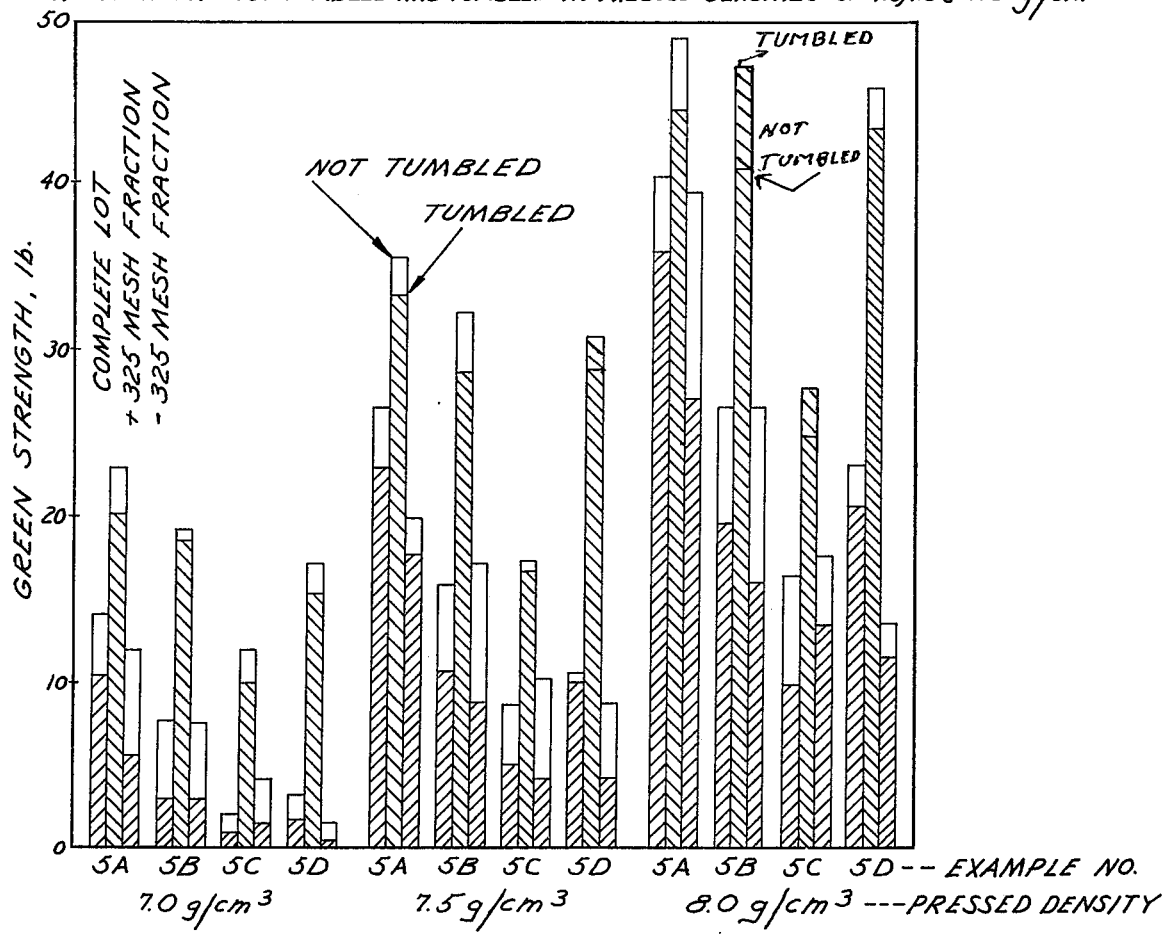
FIG. 8, a chart showing green strength comparisons for powders tumbled and not tumbled.

EXAMPLE 5 a. A blending test was used to determine the stability of powders to give an indication of their degradation in green strength when they are subjected to repeated pressing as recycled powders during anode compacting using high speed, automated presses. A Patterson-Kelly, twin shell V blender, one-pint capacity, Lucite unit operated at 24 RPM was used for these tests. A 200-gram sample of each of the same powders as in Examples 4A, 4B, 4C and 4D were blended for 15 minutes in the test units. All of the powders were individually pressed into compacts for determination of green strength as described in Example 1, except that compacts were pressed to green densities of 7.0, 7.5, and 8.0 as in Example 4. The test data for the tumbled powders, Examples 5A, 5B, 5C and 5D are plotted in FIG. 8 and are compared to green strength data on the powders before tumbling, Examples 4A, 4B, 4C and 4D, (FIG. 5) respectively. The results show that the tumbling reduced the green strength of all powders, but powder of this invention (Examples 4A and 5A) retained good levels of green strength and was superior to the other powders.

We claim:
1. A method of manufacturing an improved, high-purity agglomerated tantalum powder having high green strength in the absence of a binder which comprises:
  a. milling hydrided high-purity tantalum metal ingots to a predetermined particle size powder,
  b. subjecting the milled powder to a two-step heat treatment at predetermined temperatures under chemically non-reactive conditions to degas at a first temperature and then to pre-agglomerate the powder at a second and higher temperature,
  c. milling and screening the pre-agglomerated powder to separate portions larger than a first intermediate mesh size and milling, such portions and blending with the pre-agglomerated powder to achieve intermediate mesh size powders,
  d. heating the blended powder under chemically non-reactive conditions to a temperature higher than the original predetermined agglomeration temperature to agglomerate it,
  e. milling the agglomerated powder and screening to a second pass through an intermediate mesh size screen larger than said first intermediate mesh size and a relatively fine no-go mesh size,
  f. separating the fines from said screening,
  g. heating said fines under chemically non-reactive conditions to an agglomeration temperature,
  h. remilling said agglomerated fines to pass the second intermediate screen, and
  i. blending all said agglomerated powder to provide a tantalum powder ready for pressing into shapes and sintering to form low density anodes.

2. A method as defined in claim 1 in which the pre-agglomeration temperature lies in a range of 1100° to 1300° C., the second agglomeration temperature lies in a range of 1375° to 1425° C., and the final agglomeration temperature lies in a range of 1450° to 1500° C.

3. A high purity agglomerated tantalum powder as produced by the method of claim 1.

4. A method of manufacturing an improved, high-purity, agglomerated metallic powder having a high green strength in the absence of a binder and formed of the hydride forming metals of Group IVB comprising titanium, zirconium and hafnium, and Group VB comprising vanadium and columbium, which comprises:
  a. milling hydrided high-purity metal ingots in a predetermined particle size powder,
  b. subjecting the milled powder to a two-step heat treatment at predetermined temperatures under chemically non-reactive conditions to degas at a first temperature and then to pre-agglomerate the powder at a second and higher temperature, and
  c. milling and screening the pre-agglomerated powder to separate portions larger than a first intermediate mesh size and milling such portions and blending with the pre-agglomerated powder to achieve intermediate mesh size powders.

5. A method as defined in claim 4 in which the pre-agglomeration temperature lies in a range of 1100° to 1300° C., the second agglomeration temperature lies in a range of 1375° to 1425° C., and the final agglomeration temperature lies in a range of 1450° to 1500° C.

6. A high-purity agglomerated powder as produced by the method of claim 4.

7. A method of forming an improved, high-purity, agglomerated powder for use in the making of pressed and sintered anodes which comprises:
   a. forming tantalum hydride by subjecting a tantalum to ingot to a hydrogen atmosphere,
   b. milling the hydride to a particle size in a range of about 3 to 6 microns,
   c. heating the hydride powder to a temperature of about 800° C. to remove hydrogen and further to a temperature of 1100° to 1550° C. to bond finer particles to larger particles to produce a porous cake,
   d. milling and screening the material to pass about an 80 mesh screen,
   e. heating the screened material to a temperature of 1300° to 1550° C. to bond the larger particles to produce a porous cake,
   f. milling and screening the material to pass about a 35 mesh screen,
   g. screening the resulting powder to obtain a powder of about −35 to +250 mesh powder and separating the −250 mesh powder,
   h. agglomerating the −250 mesh powder at a temperature of about 1475° C. to bond the particles to produce a porous cake, remilling and screening this material to pass about a 35 mesh screen, and
   i. blending the entire powder hot for pressing and sintering.

8. An improved, high-purity agglomerated powder for use in the making of pressed and sintered anodes which typically comprises:
   a. tantalum agglomerated powder having in a screen test the following consistency:
   +80 Mesh — 37.3%
   −80 + 200 Mesh — 13.1%
   −200 + 325 Mesh — 5.7%
   −325 Mesh — 43.9%
   b. having a Fisher sub-sieve size of 9.6 microns,
   c. having a Scott density of 65.7 g/in$^3$, and
   d. having a green strength of 10 pounds or greater on 2-gram, 0.261 inch diameter parts compacted to a green density of 7.0 grams per cubic centimeter and crushed by applying force on the parts laid sideways.

9. An agglomerated tantalum powder produced by the process of claim 7 having a green strength of at least 10 pounds on 2-gram, 0.261 inch diameter parts connected to a green density of 7.0 grams per cubic centimeter and crushed by applying force on the parts laid sideways.

10. An agglomerated tantalum powder produced by the process of claim 7 having a green strength on 2-gram, 0.261 inch diameter parts of:
   a. at least 10 pounds when compacted to a green density of 7.0 grams per cubic centimeter,
   b. at least 20 pounds when compacted to a green density of 7.5 grams per cubic centimeter,
   c. at least 30 pounds when compacted to a green density of 8.0 grams per cubic centimeter, and
   d. crushed by applying force on the parts laid sideways.

11. An agglomerated tantalum powder produced by the process of claim 7 having a green strength on 2-gram, 0.261 inch diameter parts of:
   a. an average of about 14 pounds when compacted to a green density of 7.0 grams per cubic centimeter,
   b. an average of about 26 pounds when compacted to a green density of 7.5 grams per cubic centimeter,
   c. an average of about 43 pounds when compacted to a green density of 8.0 grams per cubic centimeter, and
   d. crushed by applying force on the parts laid sideways.

12. An agglomerated tantalum powder of claim 8 having an average green strength of about 18 pounds on 2-gram, 0.261 inch diameter parts compacted to a density of 7.0 grams per cubic centimeter and crushed by applying force on the parts laid sideways.

13. An agglomerated tantalum powder produced by the process of claim 7 having a specific capacitance expressed in microfarad-volts per gram (CV/g) as typically defined by the relationship:

$$CV/g = 4.625T + 12{,}261$$

where T is the sintering temperature in °C. over the temperature range of 1800° to 2000° C., said capacitance determined on anodes pressed from the powder to a green density of 7.2 grams per cubic centimeter, sintered for 30 minutes at temperature, anodized in a solution of 0.01% phosphoric acid at 200 volts for those anodes sintered at 1800° C. and at 270 volts for those anodes sintered at 2000° C., and tested for specific capacitance in a solution of 10% phosphoric acid.

14. An agglomerated tantalum powder of claim 8 having a specific capacitance of about:
   a. 3900 CV/g for anodes sintered for 30 minutes at 1800° C., and
   b. 3000 CV/g for anodes sintered for 30 minutes at 2000° C., on
   c. anodes pressed from the powder to a green density of 7.2 grams per cubic centimeter, sintered for 30 minutes at temperature, anodized in a solution of 0.01% phosphoric acid at 200 volts for anodes sintered at 1800° C. and 270 volts for those anodes sintered at 2000° C., and tested for specific capacitance in a solution of 10% phosphoric acid.

15. An agglomerated tantalum powder of claim 8 having a dissipation factor of about:
   a. 15% for anodes sintered for 30 minutes at 1800° C., and
   b. 11% for anodes sintered for 30 minutes at 2000° C., on
   c. anodes pressed from the powder to a green density of 7.2 grams per cubic centimeter, sintered for 30 minutes at temperature, anodized in a solution of 0.01% phosphoric acid at 200 volts for those anodes sintered at 1800° C. and 270 volts for those anodes sintered at 2000° C., and tested for dissipation factor in a solution of 10% phosphoric acid.

16. A process for the production of an improved, high-purity agglomerated tantalum powder which comprises:
   a. subjecting high-purity tantalum metal, consolidated by melting, to a hydrogen atmosphere to produce a friable mass,
   b. milling the hydrided mass to produce a hydride powder having an average Fisher sub-sieve particle size less than 10 microns,
   c. heating the hydride powder in a chemically non-reactive environment to remove the hydrogen,
   d. further heating the degassed powder in a chemically non-reactive environment to a sufficient temperature and for a sufficient time to produce a porous sintered cake in which at least the finer powder particles are bonded, e. milling the porous cake into aggregates each comprised of multiple initial particles, said aggregates typically having a particle size substantially larger than the initial particles of step (b), f. heating the aggregates in a chemically non-reactive environment to a sufficient temperature and for a sufficient time to produce a re-agglomerated porous cake, g. milling the re-agglomerated porous cake into aggregates each comprised of multiple initial particles, said aggregates typically having a particle size substantially larger than the initial particles of step (b), h. screening the milled, re-agglomerated powder through about a 250 mesh screen to obtain the +250 mesh aggregates and to remove −250 mesh particles or aggregates, i. heating the −250 mesh material in a chemically non-reactive environment to a sufficient temperature and for a sufficient time to produce a porous sintered cake in which the powder particles are bonded, j. milling and screening the re-agglomerated material from step (i) into aggregates each comprised of multiple initial particles, said aggregates having a particle size substantially larger than the initial particles of step (b), and k. blending the milled and screened powder from step (j) with the +250 mesh powder from step (h) to produce the final powder.

17. An agglomerated powder of the hydride forming metals of Group IVB, comprising titanium, zirconium and hafnium, and Group VB, comprising vanadian and columbium produced by:

a. subjecting the metal to a hydrogen atmosphere to produce a friable mass, b. milling the hydride mass to produce a hydride powder having an average Fisher sub-sieve particle size less than 10 microns, c. heating the hydride powder in a chemically non-reactive environment to remove the hydrogen, d. further heating the degassed powder in a chemically non-reactive environment to a sufficient temperature and for a sufficient time to produce a porous sintered cake in which at least the finer powder particles are bonded, e. milling the porous cake into aggregates each comprised of multiple initial particles, said aggregates typically having a particle size substantially larger than the initial particles of step (b), f. heating the aggregates in a chemically non-reactive environment to a sufficient temperature and for a sufficient time to produce a re-agglomerated porous cake, h. screening the milled, re-agglomerated powder through about a 250 mesh screen to obtain the +250 mesh aggregates and to remove −250 mesh particles or aggregates, i. heating the −250 mesh material in a chemically non-reactive environment to a sufficient temperature and for a sufficient time to produce a porous sintered cake in which the powder particles are bonded, j. milling and screening the re-agglomerated material from step (i) into aggregates each comprised of multiple initial particles, said aggregates having a particle size substantially larger than the initial particles of step (b), and k. blending the milled and screened powder from step (j) with the +250 mesh powder from step (h) to produce the final powder.

18. A process for producing high green strength, agglomerated powder of the hydride forming metals of Group IVB, comprising titanium, zirconium and hafnium and Group VB, comprising vanadium and columbium produced by:

a. subjecting the metal to a hydrogen atmosphere to produce a friable mass, b. milling the hydride mass to produce a hydride powder having an average Fisher sub-sieve particle size less than 10 microns, c. heating the hydride powder in a chemically non-reactive environment to remove the hydrogen, d. further heating the degassed powder in a chemically non-reactive environment to a sufficient temperature and for a sufficient time to produce a porous sintered cake in which at least the finer powder particles are bonded, e. milling the porous cake into aggregates each comprised of multiple initial particles, said aggregates typically having a particle size substantially larger than the initial particles of step (b), f. heating the aggregates in a chemically non-reactive environment to a sufficient temperature and for a sufficient time to produce a re-agglomerated porous cake, g. milling the re-agglomeration porous cake into aggregates each comprised of multiple initial particles, said aggregates typically having a particle size substantially larger than the initial particles of step (b), h. screening the milled, re-agglomerated powder through about a 250 mesh screen to obtain the +250 mesh aggregates and to remove −250 mesh particles or aggregates, i. heating the −250 mesh material in a chemically non-reactive environment to sufficient temperature and for a sufficient time to produce a porous sintered cake in which the powder particles are bonded, j. milling and screening the re-agglomerated material from step (i) into aggregates each comprised of multiple initial particles, said aggreates having a particle size substantially larger than the initial particles of step (b), and k. blending the milled and screened powder from step (j) with the +250 mesh powder from step (h) to produce the final powder.

* * * * *